US011951640B2

(12) United States Patent
Feeney

(10) Patent No.: US 11,951,640 B2
(45) Date of Patent: Apr. 9, 2024

(54) COMPONENT SEPARATING DEVICE FOR BEVERAGE PODS

(71) Applicant: Connor Feeney, Evanston, IL (US)

(72) Inventor: Connor Feeney, Evanston, IL (US)

( * ) Notice: Subject to any disclaimer, the term of this patent is extended or adjusted under 35 U.S.C. 154(b) by 121 days.

(21) Appl. No.: 17/714,768

(22) Filed: Apr. 6, 2022

(65) Prior Publication Data

US 2022/0410423 A1 Dec. 29, 2022

Related U.S. Application Data

(60) Provisional application No. 63/215,451, filed on Jun. 26, 2021.

(51) Int. Cl.
*B26B 27/00* (2006.01)
*B26F 3/02* (2006.01)

(52) U.S. Cl.
CPC ................ *B26B 27/00* (2013.01); *B26F 3/02* (2013.01)

(58) Field of Classification Search
CPC .................................. B26B 27/00; B26F 3/02
USPC ............................................................ 30/299
See application file for complete search history.

(56) References Cited

U.S. PATENT DOCUMENTS 3,581,605 A * 6/1971 Taylor ....................... B67B 7/12 30/410
3,726,545 A * 4/1973 Grim ....................... F16L 41/08 30/301
3,754,297 A * 8/1973 Metz ...................... B44D 3/162 30/477
3,760,499 A * 9/1973 Crain, Jr. .................. B26B 3/08 30/130
3,765,282 A * 10/1973 Crain, Jr. .............. B26F 1/3846 30/316
3,990,453 A * 11/1976 Douvas ............... A61F 9/00763 30/174
4,273,015 A * 6/1981 Johnson .................... B26F 1/14 83/345

(Continued)

FOREIGN PATENT DOCUMENTS

CA 2820607 A1 12/2014
CH 704029 A2 4/2012

(Continued)

OTHER PUBLICATIONS

Recycle a Cup Cutter, www.recyleacup.com, web page advertisement, date unknown.

(Continued)

*Primary Examiner* — Sean M Michalski
(74) *Attorney, Agent, or Firm* — Howson & Howson LLP

(57) ABSTRACT

A hand-held coffee pod processing device is provided that enables individual components of a coffee pod to be separated and recycled appropriately. The device includes a handle section defining an internal cavity and has opposite closed and open ends. A ring of teeth is formed on the rim of the open end and a series of ridges extend radially outward adjacent to the rim. The circular array of teeth may be inserted through a top foil of the pod and can be advanced into the mouth of the pod so that the ridges of the device are in close contact with a coffee filter within the pod. The device and pod can be rotated relative to one another so that the array of teeth of the device separates the foil from the pod and so that the ridges of the device separate the filter from the pod.

8 Claims, 6 Drawing Sheets

(56) References Cited

U.S. PATENT DOCUMENTS

| | | | | | |
|---|---|---|---|---|---|
| 4,723,466 | A * | 2/1988 | Pottorff | B26F 1/14 | 83/684 |
| 5,138,940 | A * | 8/1992 | Geissler | B26D 7/06 | 83/672 |
| 7,744,367 | B1 * | 6/2010 | Kudyba | F23D 3/28 | 30/113.1 |
| 9,144,342 | B2 | 9/2015 | Choi et al. | | |
| 9,364,019 | B2 * | 6/2016 | Healy | A23N 4/12 | |
| 10,588,449 | B2 | 3/2020 | Self | | |
| 11,083,539 | B2 * | 8/2021 | Farrag | A61C 5/42 | |
| 11,186,015 | B2 * | 11/2021 | Kara | B67B 7/30 | |
| 11,413,191 | B2 * | 8/2022 | Watanabe | A61F 11/202 | |
| 2009/0241344 | A1 * | 10/2009 | Mastroianni | B26D 3/26 | 30/355 |
| 2009/0266246 | A1 * | 10/2009 | Hood | B26D 3/10 | 83/13 |
| 2010/0050880 | A1 | 3/2010 | Suter et al. | | |
| 2010/0212520 | A1 | 8/2010 | Franssen | | |
| 2011/0036249 | A1 * | 2/2011 | Barrett | A47J 25/00 | 30/113.1 |
| 2012/0131800 | A1 * | 5/2012 | Hauser | B26D 3/26 | 30/279.2 |
| 2013/0291387 | A1 * | 11/2013 | Kerkhof | A47J 17/02 | 83/13 |
| 2014/0123505 | A1 * | 5/2014 | Raghuprasad | B67B 7/30 | 30/445 |
| 2015/0056353 | A1 * | 2/2015 | Goodman | A47J 43/26 | 30/120.2 |
| 2017/0057122 | A1 | 3/2017 | Grantham | | |
| 2020/0346370 | A1 | 11/2020 | Kara | | |

FOREIGN PATENT DOCUMENTS

| | | | |
|---|---|---|---|
| DE | 102008041793 | A1 | 3/2010 |
| DE | 102017001155 | A1 | 8/2018 |
| ES | 1068799 | U | 12/2008 |
| FR | 2937627 | A1 | 4/2010 |
| FR | 2944420 | A1 | 10/2010 |
| FR | 3069231 | A1 | 1/2019 |
| GB | 2585175 | A | 1/2021 |
| WO | 93/24405 | A1 | 12/1993 |

OTHER PUBLICATIONS

K-Cup Recycling Tool Grounds Extractor Separator for Single Use Cup, web page advertisement, date unknown.

Kupit! Coffee Pod Recycling Tool, web page advertisement, date unknown.

* cited by examiner

COMPONENT SEPARATING DEVICE FOR BEVERAGE PODS

CROSS REFERENCE TO RELATED APPLICATIONS

This application claims the benefit under 35 USC § 119(e) of U.S. Provisional Patent Application No. 63/215,451 filed Jun. 26, 2021.

FIELD OF THE INVENTION

The present invention relates to a device and method for separating the contents of pods used for the preparation of beverages. Specifically, the present invention relates to a device that penetrates through the top foil layer of a coffee pod and tears the coffee filter away from the internal wall of the plastic cup in a manner that facilitates the recycling of the coffee pod components.

BACKGROUND OF THE INVENTION

Over the past decade or so, single-cup coffee brewing systems have become a predominant means of making coffee. In March 2019, it was estimated that approximately 41% of Americans own a single-cup coffee maker. This percentage is only expected to rise in coming years, as is the number of single-use, disposable coffee pods that are consumed in the process. K-Cup® brand coffee pods manufactured by Keurig Green Mountain, Inc. are particularly popular in the market. While coffee pods such as these offer a quick and convenient means for producing a cup of coffee, the environmental impact of disposing of these coffee pods is concerning. For the fiscal year ending in September 2015, it was estimated that 10.5 billion K-Cup® coffee pods were sold. While the individual components that make up a typical coffee pod are recyclable on their own, a coffee pod cannot be recycled as-is due to its hybrid construction of plastic, foil, paper, and food. It is too difficult for recycling facilities and many product users to dismantle coffee pods and separate out their individual components.

Technologies have been developed that aim to facilitate the recycling of single-use, disposable coffee pods, however there are no current product offerings to date that can directly facilitate the separation of every single component of a coffee pod. Several products specialize in cutting the outer plastic cup of the coffee pod just below its rim. This results in the separation of the majority of the plastic cup; however, the foil, filter, coffee, and part of the rim remain as an intact unit. Some products puncture the foil on the coffee pod and allow access to the inside of the coffee pod, but do not assist with separating the filter that is attached to the inside of the plastic cup. All this being said, there is a significant need for a technology capable of overcoming these inadequacies and disadvantages.

SUMMARY

In accordance with an embodiment of the present innovation, disclosed is a coffee pod processing device for cutting the foil lid of a coffee pod and dislodging the coffee filter that is attached to the inside of the plastic cup. Use of this device results in the ability to isolate each individual component of a coffee pod in such a manner that they can be separated, for instance, so that the pod, foil, and plastic ring may be recycled and the spent coffee grounds and/or filter may be used as composting material, soil amendment material, or may be disposed as refuse. An embodiment of this pod processing device includes a hollow handle section defining an internal cavity and having a closed end and an opposite open end defining a rim; a ring of teeth formed on the rim; and a series of ridges extending radially outward adjacent to the rim. In use, the circular array of teeth can be inserted through the top foil of the pod covering the mouth of the pod and can be advanced into the mouth of the pod so that the ridges of the device are in close contact with a coffee filter which is also secured to the rim of the pod and extends within the pod. The device and pod can be rotated relative to one another so that the array of teeth of the device separates the foil from the pod and so that the ridges of the device separate the filter from the rim of the pod. If desired, the pod/device combination can then be positioned in a substantially upright position enabling the severed foil and spent coffee grounds to fall within the open cavity of the handle. In this or like manner, the user may collect and recycle the pod, any internal plastic ring or disc, and the foil and may use the spent coffee grounds and/or filter as compost material or soil amendment material.

In some contemplated embodiments, the ridges may be configured to extend further radially outward as the ridges extend longitudinally to the rim of the handle. In addition, the total number of teeth on the rim of the handle may be few or many, such as ten or more. The device may be molded as a single piece of plastic. Alternatively, the rim portion of the handle may be separate from the remainder of the handle so that the rim portion may be replaceable after several uses. In addition, the configuration of the teeth and ridges may be altered and may be made of plastic or metal. Further, the handle may have a multi-sided wall enabling ready slip-free gripping. Still further, the handle may be provided in a disk or puck shape.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
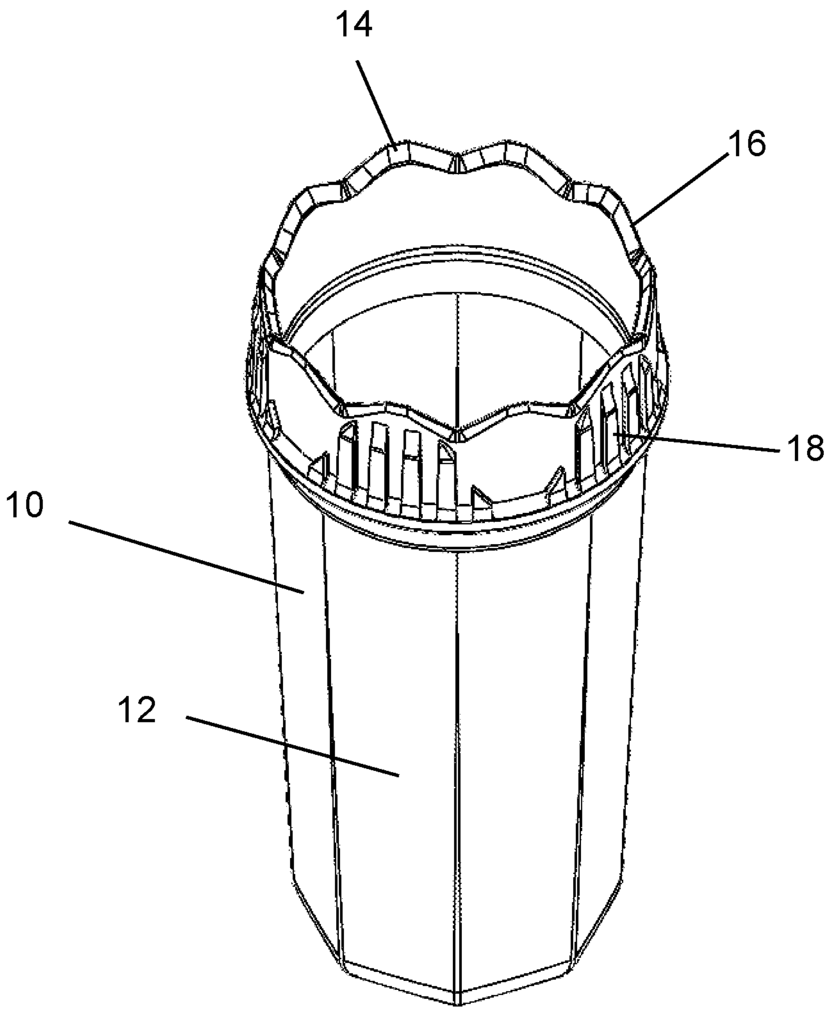
FIG. 1 illustrates a perspective view of a component separating device, according to one embodiment of the present invention.

FIG. 1 illustrates an embodiment of a device 10 capable of separating the contents of pods used for the preparation of beverages. The device 10 features a handle 12 for the user to grip, a circular array of teeth 14 formed on a rim 16 for penetrating through a top foil layer of a coffee pod, a series of ridges 18 extending radially outward adjacent to the rim 16 for detaching the coffee pod's filter from the inside of the coffee pod's plastic cup, and an internal cavity 20 within the device 10 that facilitates the temporary relocation of coffee pod components away from the location where work is being applied to detach the coffee filter which thereby makes rotating the device 10 within the coffee pod easier.

Figure 2:
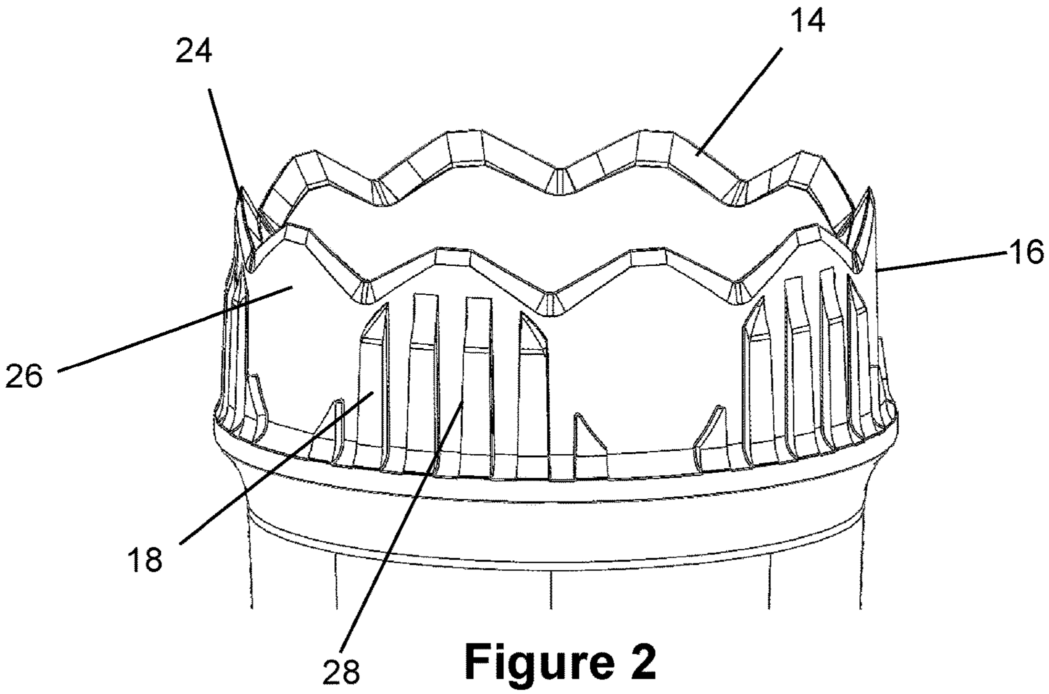
FIG. 2 illustrates an example of a perspective view of a circular array of teeth formed on the rim of a component separating device, according to one embodiment of the present invention.

FIG. 2 illustrates the circular array of teeth 14 formed on the rim 16 used to penetrate through the top foil layer of a coffee pod. At their maximal point, the effective diameter of the circular array of teeth 14 formed on the rim 16 of the device 10 is smaller than the diameter of the inner rim of the coffee pod's plastic cup. The smaller diameter allows for the circular array of teeth 14 formed on the rim 16 to be plunged into the coffee pod without coming into direct interference with the inner rim of the plastic cup. The inner diameter of the plastic cup of a coffee pod compatible with Keurig® single-cup coffee makers, for instance, has an internal diameter of approximately 44.0 mm. At the maximal tip of the array of teeth 14 formed on the rim 16, the effective diameter of the device 10 may be approximately 41.5 mm, as an example. The spatial positioning of the individual teeth allows for force to be distributed evenly when the array of teeth 14 formed on the rim 16 are pushed into the aluminum foil of a coffee pod. This more even distribution of force around the perimeter allows for a disc of aluminum foil to be cut out in a relatively uniform circular shape. While still very capable of piercing through the aluminum foil, the array of teeth 14 formed on the rim 16 are not sharp to the touch. Other ways or means or components capable of piercing through the foil layer in a similar fashion that are also contemplated include, but are not limited to, blades or saws.

Figure 3:
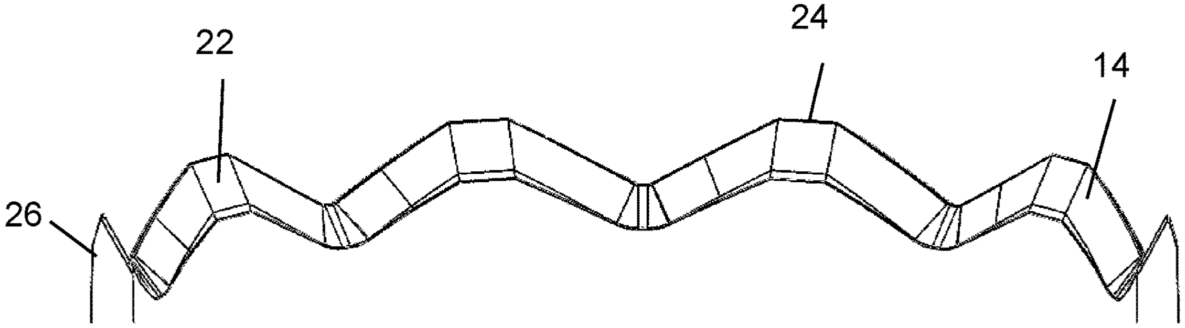
FIG. 3 illustrates an example of a cross-sectional view of a circular array of teeth formed on the rim of a component separating device, according to one embodiment of the present invention.

FIG. 3 illustrates an embodiment of a cross-sectional view of a circular array of teeth 14 formed on the rim 16 of the device 10. The slope of the teeth on the inside wall 22 of the device 10 are more severe than that of the pointed edges 24 on the outer wall 26 of the device 10. When the device 10 penetrates through the top foil layer of a coffee pod, the outer wall 26 of the device 10 can lay flush with the inside surface of the plastic cup. This closer fit helps contain the coffee pod components within the device and plastic cup during the separation process, minimizing any potential mess. The more severe slope of the inside wall 22 of the pointed edges 24 is designed to reduce potential friction between the device 10 and the coffee pod components (such as the coffee grounds) and facilitate their relocation into the internal cavity 20 of the device 10.

Figure 4:
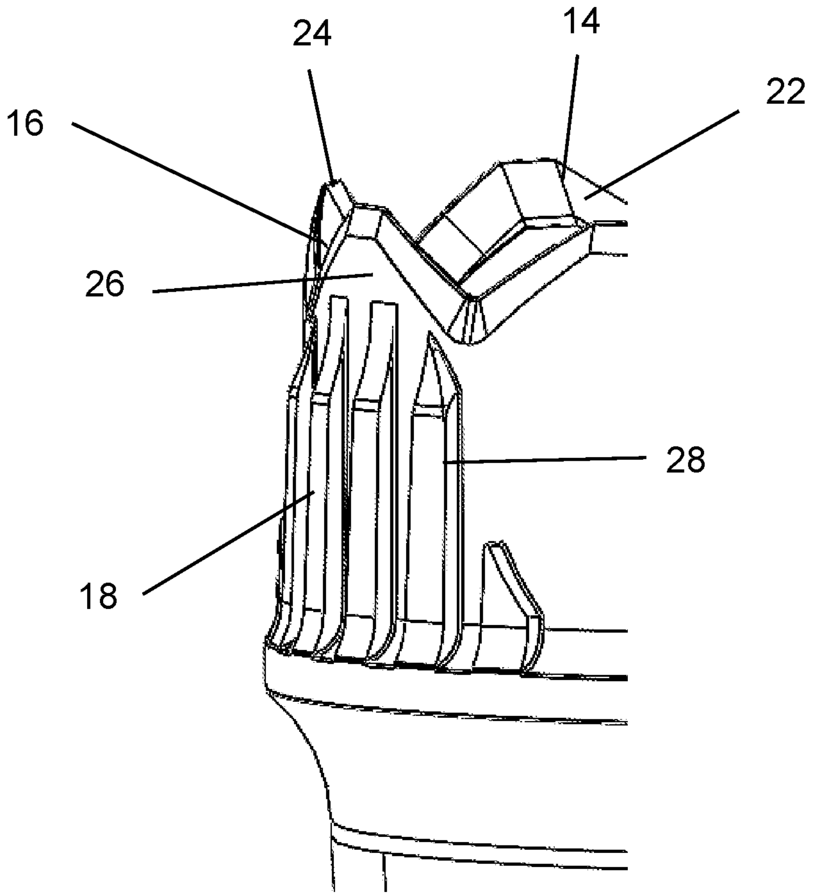
FIG. 4 illustrates an example of a perspective view of a series of ridges extending radially outward adjacent to the rim of a component separating device, according to one embodiment of the present invention.

FIG. 4 illustrates an embodiment of the series of ridges 18 extending radially outward adjacent to the rim 16 of the device 10. As the ridges rise off the outer wall 26 of the device 10, edges 28 are created that run parallel to the length of the device 10. When contacting the coffee filter during the component separation process, these edges 28 facilitate the scraping of the coffee filter from the inside surface of the plastic cup.

Figure 5:
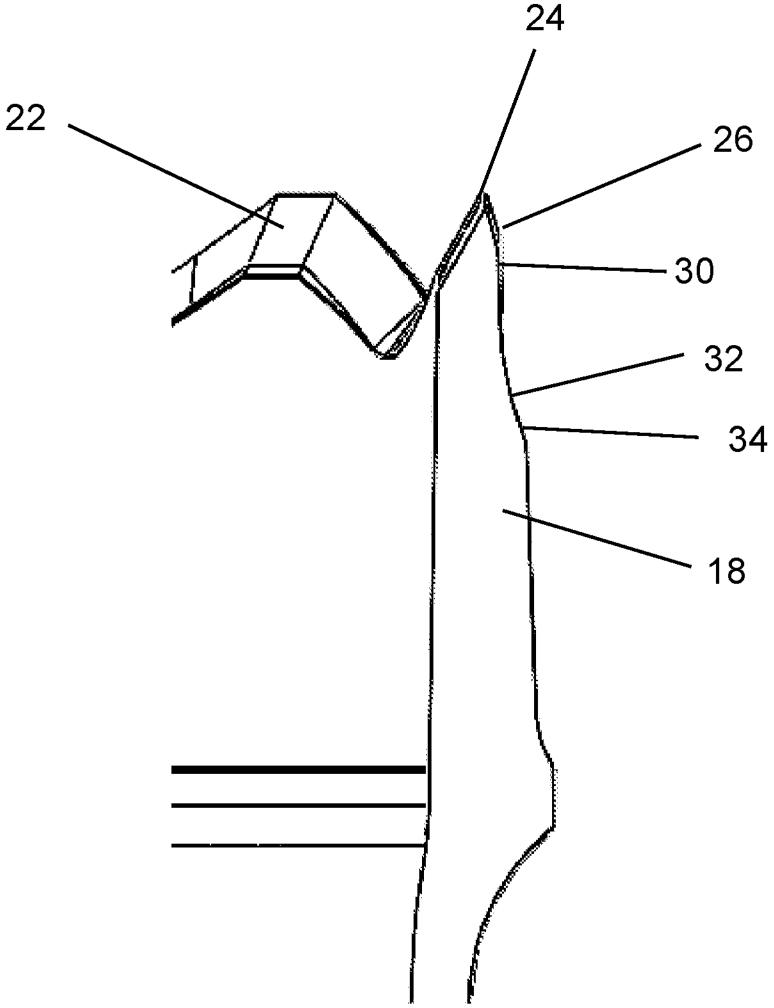
FIG. 5 illustrates an example of a cross-sectional view of a ridge extending radially outward adjacent to the rim of a component separating device, according to one embodiment of the present invention.

FIG. 5 illustrates an embodiment of a cross-sectional view of ridges 18 extending radially outward adjacent to the rim 16 of the device 10. Toward the top of the device 10, closest to the maximal point of the circular array of teeth 14 formed on the rim 16, the ridges 18 are initially flush with the outer wall 26 of the device 10. Moving down the length of the device 10, the height (i.e., extending in a radial or lateral direction) of the ridges 18 increase and create direct interference between the embedded ridges 18 and the coffee filter attached to the inside rim of the plastic cup. This variance in embedded ridge height allows for the device 10 to at first be plunged into the plastic cup of the coffee pod with minimal resistance and then transition into a tighter fit between the device and the plastic cup. A combination of this tight fit, the hard edges 28 of the ridges 18, a firm grasp on the coffee pod just below the plastic cup's lip, and rotation facilitates the user's ability to scrape the coffee filter away from the inner surface of the plastic cup.

By way of example, at the location 30, where the embedded ridges 18 are flush with the outer wall 26 of the device 10 (closest to the circular array of teeth 14), there may be an effective diameter of approximately 42 mm. This effective diameter is smaller than the internal diameter of the coffee pod's plastic cup and thus allows for penetration of the device 10 into the coffee pod without direct resistance by the plastic cup. Moving down the length of the device 10 from the rim 16, the ridges 18 increase in height (i.e., extend laterally outward to a greater extent) relative to the outer wall 26 of the device 10 and their initial flush position at location 30. This increased height (i.e., lateral extension) translates to an increase in the effective diameter of the device 10 to approximately 44 mm at location 32, for instance, matching the approximate internal diameter of the plastic cup and thus creating a tight fit. Continuing to move down the length of the device 10, the height of the ridges 18 relative to the outer wall 26 continues to increase giving the outer wall of the device an effective diameter of approximately 45 mm at location 34. This effective diameter exceeds the approximate internal diameter of the plastic cup which causes the device to interfere with the inner rim of the plastic cup to such a degree that further insertion of the device into the mouth of the pod is inhibited. At the approximate, maximum penetration depth of the device 10 into the mouth of the pod, the series of ridges 18 extending radially outward adjacent to the rim 16 of the device 10 are in close proximity to where the coffee filter is attached to the inside surface of the plastic cup. This thus allows for the embedded ridges 18 to be closely located for the component separation process by the device user in a fashion that is both repeatable and consistent. Other ways or means or components capable of detaching the coffee filter from the inside surface of the plastic cup in a similar fashion that are also contemplated include, but are not limited to, grated surfaces, barbed surfaces, or perforated surfaces.

Figure 6:
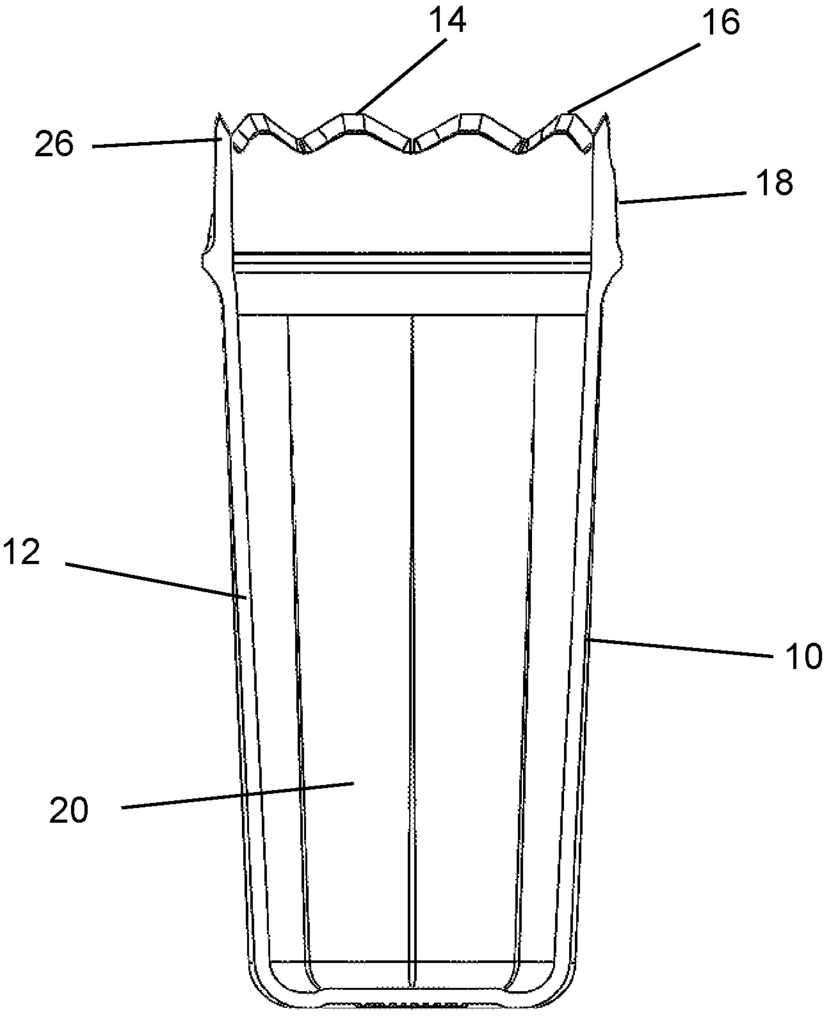
FIG. 6 illustrates an example of a cross-sectional view of a hollow handle section defining an internal cavity and having a closed end and an opposite open end defining a rim of a component separating device, according to one embodiment of the present invention.

FIG. 6 illustrates an embodiment of the internal cavity 20 within the handle 12 of the device 10. During the component separation process, this internal cavity 20 provides a space for loose coffee grounds and the coffee filter to be relocated. When there is less material in the vicinity of where the coffee filter is attached to the inside rim of the plastic cup, it is easier to both rotate the device within the coffee pod and press the plastic cup against the device's embedded ridges to improve the efficacy of detaching the coffee filter. Additionally, the design of this internal cavity allows for the entire device to be manufactured with a single shot of plastic during an injection molding process. No additional assembly or modifications are needed to create a functional device 10.

Figure 7:
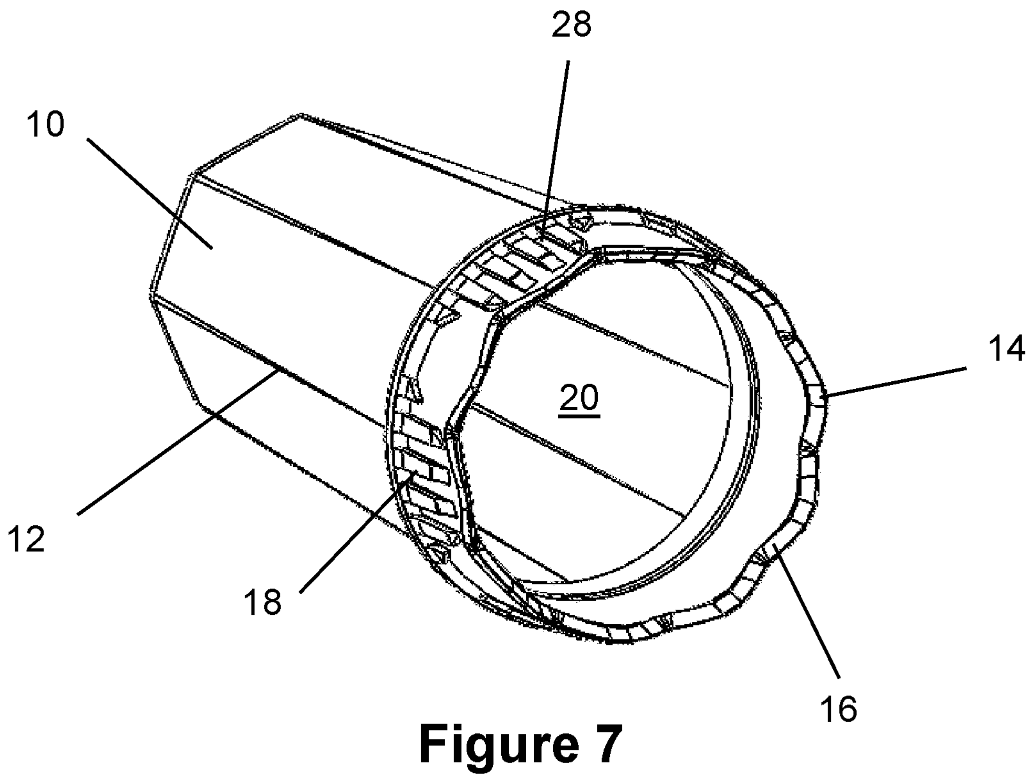
FIG. 7 illustrates an example of a perspective view of a hollow handle section defining an internal cavity and having a closed end and an opposite open end defining a rim of a component separating device, according to one embodiment of the present invention.

FIG. 7 illustrates an embodiment of the handle 12 of the device 10. This handle 12 allows for the user to firmly grip the device 10 during the component separation process. Moving down the length of the device 10 from the rim 16, the cross-sectional shape of the handle 12 may transition from a circular shape to a polygon shape. This thus creates edges on the handle 12 that can help facilitate the component separation process by providing favorable ergonomics for exerting torque. The gradual transition from a circular shape to a polygon shape allows for a relatively seamless integration between the handle 12 and other device features (such as the outer wall 26 that the embedded ridges 18 are formed) while at the same time allowing for the handle 12 to maintain a relatively uniform wall thickness down the length of the device 10. Other ways or means or components capable of allowing the user to firmly grip the device in a similar fashion that are also contemplated include, but are not limited to, having a modular handle on which the top of the device (featuring components such as the ring of pointed teeth and embedded ridges) can be installed.

Figure 8:
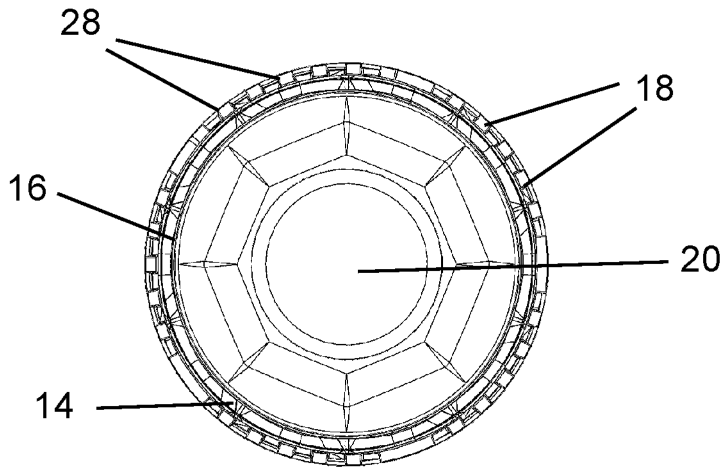
FIG. 8 is a top plan view of the component separating device of FIG. 1.

FIG. 8 provides an example of a top plan view of the device 10. The ridges 18 extend radially outward from the outer wall 26 and from the teeth 14.

The foregoing description and specific embodiments are merely illustrative of the principles thereof, and various modifications and additions may be made to the anchor by those skilled in the art, without departing from the spirit and scope of this invention.

I claim:

1. A hand-held device for use in separating components of a coffee pod, the components of the coffee pod including a plastic cup having a rim defining a mouth of the plastic cup, a top foil secured to the rim and covering the mouth, a coffee filter secured to the plastic cup and defining an area within the plastic cup between the top foil and coffee filter in which coffee grounds are contained, said hand-held device comprising:

- a hollow handle section defining an internal cavity, said handle section having an open end with a rim and an opposite closed end;
- a circular array of teeth formed on the rim of the handle section such that the circular array of teeth project from said rim; and
- a series of ridges extending radially outward of the handle section adjacent the rim of the handle section such that the series of ridges extend laterally outward of the circular array of teeth and include a plurality of exposed edges extending longitudinally relative to the handle section.

2. The device according of claim 1, wherein the circular array of teeth are arranged relative to the series of ridges such that when the circular array of teeth is inserted through the top foil of the coffee pod and is advanced into the coffee pod, the series of ridges are in position against an inside edge of the rim of the coffee pod to sever the coffee filter from the plastic cup upon rotation of the handle section relative to the coffee pod.

3. The device according to claim 1, wherein the internal cavity of the handle section is positioned relative to the circular array of teeth and series of ridges such that the top foil, the filter, and coffee grounds of the coffee pod fall into and are contained within the internal cavity of the handle section when the top foil and filter are severed from the coffee pod by the circular array of teeth and series of ridges of the handle section.

4. The device according claim 1, wherein the circular array of teeth and series of ridges are integrally formed with the handle section.

5. The device according claim 1, wherein the circular array of teeth, series of ridges, and handle section are made of plastic.

6. The device according to claim 1, wherein the plurality of exposed edges of the series of ridges tapers outward as said exposed edges extend in a direction away from the circular array of teeth.

7. A hand-held device for use in separating components of coffee pod, the components of the coffee pod including a plastic cup having a rim defining a mouth of the plastic cup, a top foil secured to the rim and covering the mouth, a coffee filter secured to the plastic cup and defining an area within the plastic cup between the top foil and coffee filter in which coffee grounds are contained, said hand-held device comprising: a handle; and a first coffee pod component separating member connected to said handle and being removable from the handle and replaceable with a second coffee pod component separating member; wherein each of the first and second coffee pod component separating members includes a circular array of teeth projecting from a rim of an open end of the device when connected to said handle and each of the first and second coffee pod component separating members includes a series of ridges extending radially outward of said circular array of teeth and provide a plurality of exposed edges extending longitudinally relative to the handle when connected to said handle.

8. The device according to claim 7, wherein the circular array of teeth are arranged relative to the series of ridges on each of the first and second coffee pod component separating members such that when the circular array of teeth is inserted through the top foil of the coffee pod and is advanced into the coffee pod, the series of ridges are in position against an inside edge of the rim of the coffee pod to sever the coffee filter from the plastic cup upon rotation of the handle relative to the coffee pod.

* * * * *